(12) United States Patent
Herrmann

(10) Patent No.: US 12,000,450 B2
(45) Date of Patent: Jun. 4, 2024

(54) TORQUE TRANSFER DEVICE HAVING A CONTROL SYSTEM FOR DETERMINING THE DIRECTION OF ROTATION OF THE ROTOR

(71) Applicant: Schaeffler Technologies AG & Co. KG, Herzogenaurach (DE)

(72) Inventor: Johannes Herrmann, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 719 days.

(21) Appl. No.: 17/058,372

(22) PCT Filed: Jun. 3, 2019

(86) PCT No.: PCT/DE2019/100484
§ 371 (c)(1),
(2) Date: Nov. 24, 2020

(87) PCT Pub. No.: WO2020/001681
PCT Pub. Date: Jan. 2, 2020

(65) Prior Publication Data
US 2021/0199174 A1    Jul. 1, 2021

(30) Foreign Application Priority Data

Jun. 26, 2018 (DE) .......................... 102018115310.4

(51) Int. Cl.
*F16F 15/00* (2006.01)
*B60K 6/26* (2007.10)
(Continued)

(52) U.S. Cl.
CPC ........ *F16F 15/002* (2013.01); *F02N 11/0859* (2013.01); *F16F 15/145* (2013.01);
(Continued)

(58) Field of Classification Search
CPC ............ B60W 30/20; B60W 2030/206; B60K 2006/268; H02P 6/18; H02P 7/03;
(Continued)

(56) References Cited

U.S. PATENT DOCUMENTS 8,718,854 B2 * 5/2014 Hashimoto ............. B60L 15/20
903/930
8,944,925 B2 * 2/2015 Sakai ...................... F16F 15/30
464/68.7
(Continued)

FOREIGN PATENT DOCUMENTS

CN          102597489 A        7/2012
CN          103692918 A        4/2014
(Continued)

*Primary Examiner* — Emma K Frick

(57) ABSTRACT

A torque transfer device is provided, for a powertrain of a motor vehicle, comprising an electric motor having a stator and a rotor rotatable relative thereto. A control system is provided which can output a current pulse to the electric motor, wherein the current pulse effects a rotary motion of the rotor in a first direction of rotation and through a first angle of rotation and thus effects an induced voltage, which is received by the control system to determine the direction of rotation or the rotary position of the rotor in relation to the stator. The rotor is connected to a torsional vibration damper comprising a damper input and a damper output; rotatable in a limited manner in relation to the damper input, against the effect of energy storage elements, and the rotary motion of the rotor causes a relative rotation between the damper input and the damper output.

8 Claims, 1 Drawing Sheet

(51) Int. Cl.
*F02N 11/08* (2006.01)
*F16F 15/14* (2006.01)
*F16F 15/26* (2006.01)
*H02P 6/18* (2016.01)
*H02P 7/03* (2016.01)

(52) U.S. Cl.
CPC ............... *F16F 15/26* (2013.01); *H02P 6/18* (2013.01); *H02P 7/03* (2016.02); *B60K 2006/268* (2013.01); *B60Y 2400/48* (2013.01)

(58) Field of Classification Search
CPC .......... F16F 15/002; F16F 15/26; F16F 15/12; B60Y 2400/48; F02N 11/0859
See application file for complete search history.

(56) References Cited

U.S. PATENT DOCUMENTS

| | | | | |
|---|---|---|---|---|
| 9,242,638 | B2 * | 1/2016 | Yamamoto | ............ B60W 20/15 |
| 9,407,181 | B2 * | 8/2016 | Furukawa | ......... H02M 7/53875 |
| 9,493,151 | B2 * | 11/2016 | Kato | ............... B60W 30/18054 |
| 10,081,364 | B2 * | 9/2018 | Nefcy | .................. B60W 30/19 |
| 10,138,978 | B2 * | 11/2018 | Sugiyama | ......... F16F 15/12353 |
| 10,498,275 | B2 * | 12/2019 | Blackwelder | ............. H02P 9/08 |
| 2018/0142759 | A1 * | 5/2018 | Finkenzeller | ........... F16D 23/12 |
| 2023/0095324 | A1 * | 3/2023 | Witt | ........................ F02D 41/22 |
| | | | | 73/114.01 |

FOREIGN PATENT DOCUMENTS

| | | |
|---|---|---|
| CN | 107532678 A | 1/2018 |
| DE | 19943036 | 3/2001 |
| DE | 102012203611 | 10/2012 |
| DE | 102014206330 | 10/2014 |
| DE | 102016211837 | 1/2018 |
| DE | 102016219623 A1 | 4/2018 |
| DE | 102017111342 B3 | 10/2018 |
| DE | 102017113627 | 12/2018 |
| DE | 102017113627 A1 | 12/2018 |
| EP | 2199641 A2 | 6/2010 |

* cited by examiner

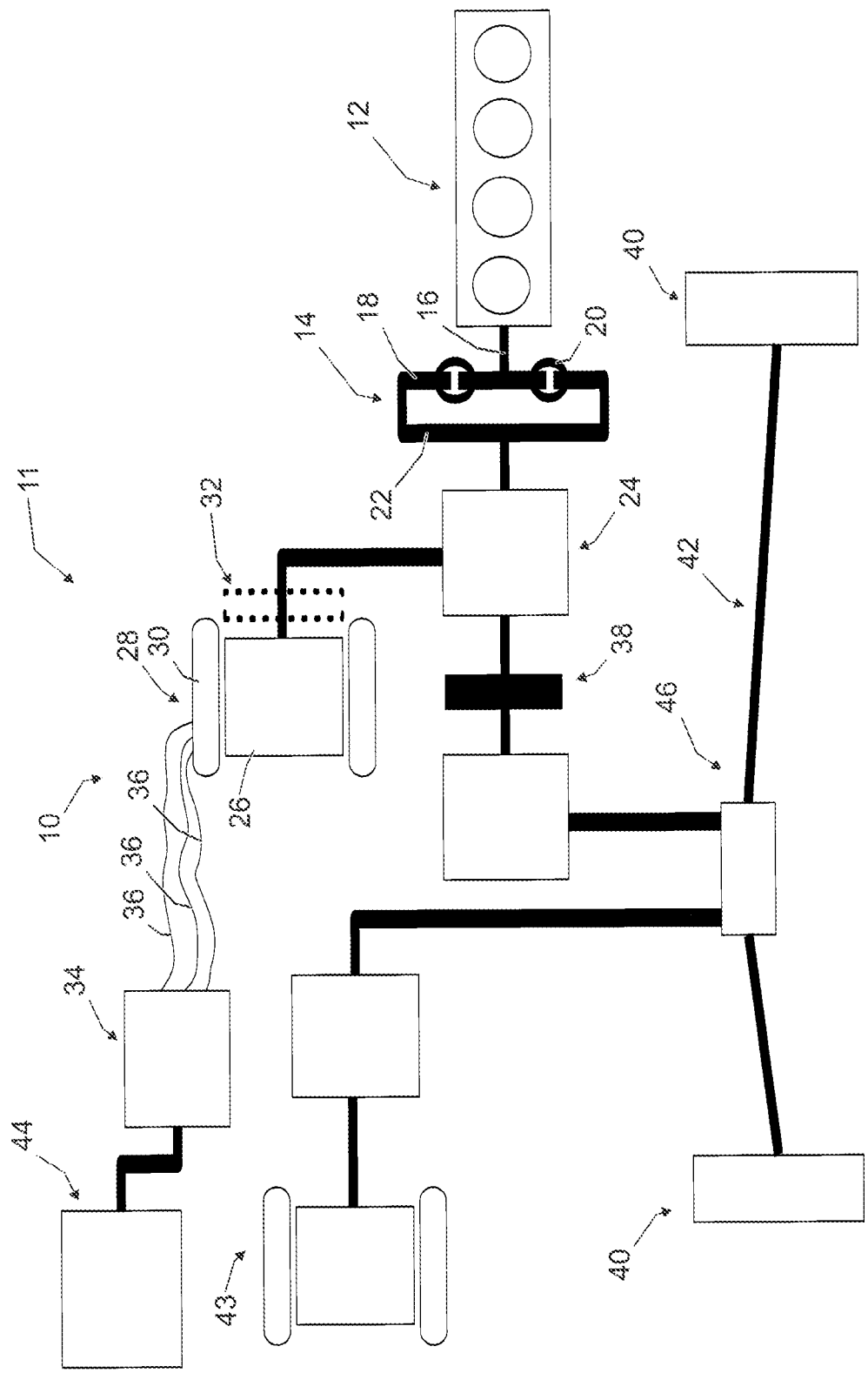

TORQUE TRANSFER DEVICE HAVING A CONTROL SYSTEM FOR DETERMINING THE DIRECTION OF ROTATION OF THE ROTOR

CROSS-REFERENCE TO RELATED APPLICATIONS

This application is the U.S. National Phase of PCT Appln. No. PCT/DE2019/100484 filed Jun. 3, 2019, which claims priority to DE 102018115310.4 filed Jun. 26, 2018, the entire disclosures of which are incorporated by reference herein.

TECHNICAL FIELD

The present disclosure relates to a torque transfer device according to the preamble of claim 1.

BACKGROUND

A torque transfer device comprising an electric motor having a stator and a rotor rotatable relative thereto is generally known. For example, such torque transfer devices are used in a powertrain of a motor vehicle. Such a powertrain can be part of a hybrid drive in which an internal combustion engine is used in addition to the electric motor.

To commutate the electric motor, it is necessary to know the rotary position of the rotor, i.e., the angular position of the rotor. There are various sensors for this, for example magnetic field-based or optical sensors. For example, the German patent application 10 2017 113 627 describes a resolver which makes it possible to detect an angular position of the rotor. A resolver is an additional component that takes up space, which entails an increased structural effort and results in additional costs.

A method for determining a position of a rotor of a commutated electric motor is known from DE 10 2016 211 837 A1, in which the electric motor is rotated and the voltage induced in the three phases of the electric motor and, accordingly, the counter-EMF are measured. This measurement can then be used to determine the angular position of the rotor. The rotor can be rotated from outside or it can drive itself electrically, wherein the induced voltage is then measured in a non-current-carrying output of the electric motor.

If the electric motor is actively caused to rotate by a current pulse, this can result in a rotary motion in one of the directions of rotation of the rotor. When the rotor is coupled to an internal combustion engine, a rotary motion of the rotor in the wrong direction can, however, damage or even destroy the internal combustion engine.

SUMMARY

The object of the present invention is to propose a torque transfer device in which the risk of damage to or destruction of the internal combustion engine is reduced or prevented. Furthermore, an object of the present invention is to dispense with a sensor or a resolver for recognizing the rotary position of the rotor in relation to the stator. The installation space required for a torque transfer device should also be reduced. A further object is to improve a torque transfer device.

At least one of these objects is achieved by a torque transfer device with the features described in the claims. Correspondingly, a torque transfer device, in particular in a powertrain of a motor vehicle is proposed, having an electric motor having a stator and a rotor rotatable relative thereto, a control system which can output a current pulse to the electric motor, wherein the current pulse effects a rotary motion of the rotor in a first direction of rotation and through a first angle of rotation and thus effects an induced voltage, which is received by the control system and by which the control system determines the direction of rotation and/or the rotary position of the rotor in relation to the stator, wherein the rotor is connected to a torsional vibration damper comprising a damper input and a damper output, wherein the damper output is rotatable in a limited manner in relation to the damper input, against the effect of energy storage elements, and the rotary motion of the rotor is able to bring about a relative rotation between the damper input and the damper output. As a result, a sensor or a resolver for detecting the angular position of the rotor in relation to the stator can be dispensed with. The installation space required for the torque transfer device can also be reduced, the torque transfer device can be made shorter and the torque transfer device is thus improved overall.

The current pulse can bring about a brief dynamic rotary motion of the rotor. This rotary motion can mainly be characterized by a changing angular acceleration.

The torsional vibration damper can be designed as a dual-mass flywheel. The torsional vibration damper can be operated in an oil bath, i.e., wet, or it can be designed to run dry. Grease lubrication, in particular of the energy storage elements, can be provided. The energy storage elements can be designed as springs, in particular as bow springs.

The control system can comprise the motor control for commutating the electric motor. The control system can control the electric motor via three motor phases.

The detection of the direction of rotation and/or the rotary position of the rotor may be necessary for each learning process of the motor control, for example when the torque transfer device is first started up, after the vehicle comprising the torque transfer device has been towed or after the voltage supply has been changed, in particular for the control system.

The rotary position comprises at least the detection of the angular position of the rotor.

In a specific embodiment of the disclosure, the electric motor is electrically controlled by at least three motor phases, wherein the control system can output the current pulse via the first motor phase and read out the induced voltage via the second and third motor phases.

In a particularly advantageous embodiment of the disclosure, the rotor is connected to the damper output and the rotary motion of the rotor causes a rotary motion of the damper output through a second angle of rotation. The second angle of rotation can be equal to, smaller or larger than the first angle of rotation. The rotor can be connected non-rotatably to the damper output.

In a specific embodiment of the disclosure, a crankshaft of an internal combustion engine is connected to the damper input. The crankshaft can be connected to the damper input in a non-rotatable manner.

In a preferred embodiment of the disclosure, the current pulse is output when the internal combustion engine is stationary, i.e., not rotating. The direction of rotation and/or the rotary position of the rotor can be detected when the internal combustion engine is stationary, i.e., not rotating. When the internal combustion engine is rotating, the rotary position and/or direction of rotation of the motor can also be detected by measuring the voltage induced by the rotation of the rotor via two motor phases. This can be done during the operation of the torque transfer device.

In a particularly preferred embodiment of the disclosure, the rotary motion of the rotor causes a rotary motion of the damper input through a third angle of rotation which is smaller than the first and/or second angle of rotation, preferably zero. This can prevent damage to or destruction of the internal combustion engine if the rotary motion of the rotor and the associated crankshaft excited by the current pulse should take place in the negative, i.e., the wrong direction of rotation of the internal combustion engine. The energy storage elements of the torsional vibration damper are able to absorb the kinetic energy of the dynamic rotary motion of the rotor, to store it as potential energy and to release it in the form of kinetic energy. The absorption and release of the kinetic energy takes place preferably from and to the damper output. A transmission of the rotary motion from the rotor to the internal combustion engine can be prevented or reduced.

In a further particularly advantageous embodiment of the disclosure, the electric motor is designed as a starter generator and can mechanically start the internal combustion engine.

In a specific embodiment of the disclosure, the electric motor is connected to the torsional vibration damper via a transmission.

In a further preferred embodiment of the disclosure, the internal combustion engine can transfer a torque to an output side via a K0 clutch and/or transfer a torque to the electric motor.

In a specific embodiment of the disclosure, a second electric motor is provided for transferring a torque to the output side, for example vehicle wheels. The electric motor can be designed as a generator and as a starter and the second electric motor can serve as a drive element for moving the vehicle.

The internal combustion engine can provide the electric motor with mechanical energy, which the electric motor can convert into electrical energy. This electrical energy can be provided to supply a battery and/or the second electric motor. In the latter case, it is a serial hybrid powertrain.

The internal combustion engine can provide its mechanical energy for locomotion of the vehicle exclusively to the electric motor or alternatively or additionally mechanically to an output side, for example vehicle wheels. This structure corresponds to a serial power-split hybrid powertrain.

Further advantages and advantageous embodiments of the invention result from the description of the figures and the drawings.

BRIEF DESCRIPTION OF THE DRAWINGS

The invention is described in detail below with reference to the drawing, wherein:

The single FIGURE shows a torque transfer device according to an embodiment of the disclosure.

DETAILED DESCRIPTION

The single FIGURE shows a torque transfer device 10 according to an embodiment of the disclosure. The torque transfer device 10 is part of a powertrain 11, in particular a hybrid powertrain of a motor vehicle.

The powertrain 11 comprises an internal combustion engine 12 for providing mechanical energy, which is connected to a torsional vibration damper 14. For this purpose, a crankshaft 16 of the internal combustion engine 12 is connected in a rotationally fixed manner to a damper input 18 of the torsional vibration damper 14. The damper input 18 is rotatable in a limited manner in relation to a damper output 22 against the effect of energy storage elements 20. The damper output 22 is connected to a rotor 26 of an electric motor 28 via a transmission 24.

The electric motor 28 also comprises a stator 30, with respect to which the rotor 26 has a specific rotary position, i.e., a specific angular position. This rotary position is decisive for defining the commutation of the electric motor 28. It is therefore crucial to detect both the direction of rotation of the electric motor 28 and its rotary position in relation to the stator 30 in order to be able to set the commutation of the electric motor 28 accordingly.

The rotary position of the rotor 26 is usually detected by sensors or a resolver 32 which is not required here and is drawn in dashed lines. According to the present disclosure, a control system 34 that controls the electric motor 28 via motor phases 36 outputs a current pulse to the electric motor 28, wherein the current pulse brings about the rotation of the rotor 26 in a first direction of rotation and through a first angle of rotation and thereby effects an induced voltage which can be received by the control system 34. This enables the control system 34 to determine the direction of rotation and/or the rotary position of the rotor 26 in relation to the stator 30.

The electric motor 28 is designed as a generator and/or starter for starting the internal combustion engine 12. For this purpose, there is a mechanical connection between the rotor 26 of the electric motor 28 and the crankshaft 16 of the internal combustion engine 12. A uniform rotary motion of the rotor 26 thus brings about a uniform rotary motion of the crankshaft 16 of the internal combustion engine 12.

If the rotor 26 of the electric motor 28 rotates in a negative direction, i.e., the wrong direction of rotation relative to the internal combustion engine 12, this can destroy the internal combustion engine 12. To detect the direction of rotation and/or the rotary position of the rotor 26, the control system 34 sends a current pulse to a motor phase 36, as a result of which the rotor 26 executes a rotary motion through a first angle of rotation. This rotary motion by the first angle of rotation is transferred to the damper output 22, which is thereby rotated through a second angle of rotation, which can be equal to the first angle of rotation.

The effect of the energy storage elements 20 as mechanical buffer elements prevents the dynamic rotary motion from being passed on from the damper output 22 to the damper input 18. If the rotor 26 is thus to rotate in the wrong direction of rotation with respect to the internal combustion engine 12, the rotary motion caused by the current pulse is absorbed by the energy storage elements 20 and advantageously not passed on to the crankshaft 16. This can prevent the internal combustion engine 12 from being damaged or destroyed in the event of the rotary motion of the rotor 26 caused by the control system 34.

The internal combustion engine 12 can transfer a torque via a K0 clutch 38 to an output side 46, for example to a vehicle axle 42 driving vehicle wheels 40. When the K0 clutch is disengaged, the torque is transferred from the internal combustion engine 12 exclusively to the electric motor 28. The electric motor 28 can supply a second electric motor 43 and/or a battery 44 with electrical energy. This is a serial hybrid powertrain if the electric motor 28 is provided for the electrical supply of the second electric motor 43 which drives the vehicle axle 42.

The internal combustion engine 12 can provide its mechanical energy for locomotion of the vehicle exclusively to the electric motor 28 or alternatively or additionally mechanically to an output side 46, for example the vehicle axle 42. This structure corresponds to a serial power-split hybrid powertrain. The torque required to move the vehicle can either be provided exclusively via the second electric motor 43 or exclusively via the internal combustion engine 12 or in part by both.

LIST OF REFERENCE NUMBERS

10 Torque transfer device
11 Powertrain
12 Internal combustion engine
14 Torsional vibration damper
16 Crankshaft
18 Damper input
20 Energy storage elements
22 Damper output
24 Transmission
26 Rotor
28 Electric motor
30 Stator
32 Resolver
34 Control system
36 Motor phase
38 K0 clutch
40 Vehicle wheel
42 Vehicle axle
43 Electric motor
44 Battery
46 Output side

The invention claimed is:

1. A torque transfer device, for a powertrain of a motor vehicle, comprising:
   an electric motor having a stator and a rotor rotatable relative thereto,
   a control system configured to output a current pulse to the electric motor, wherein the current pulse effects a rotary motion of the rotor in a first direction of rotation and through a first angle of rotation and thus effects an induced voltage, which is received by the control system and by which the control system determines the direction of rotation or the rotary position of the rotor in relation to the stator,
   wherein the rotor is connected to a torsional vibration damper comprising a damper input and a damper output, wherein the damper output is rotatable in a limited manner in relation to the damper input, against an effect of energy storage elements, and the rotary motion of the rotor brings about a relative rotation between the damper input and damper output,
   wherein the rotor is connected to the damper output and the rotary motion of the rotor causes a rotary motion of the damper output through a second angle of rotation, and
   wherein the rotary motion of the rotor causes a rotary motion of the damper input through a third angle of rotation which is smaller than the first or second angle of rotation.

2. The torque transfer device according to claim 1, wherein the electric motor is electrically controllable by at least three motor phases and the control system is configured to output the current pulse via a first motor phase and the induced voltage via second and third motor phases.

3. The torque transfer device according to claim 1, wherein a crankshaft of an internal combustion engine is connected to the damper input.

4. The torque transfer device according to claim 3, wherein the current pulse is output when the internal combustion engine is stationary, i.e., not rotating.

5. The torque transfer device according to claim 3, wherein the electric motor is designed as a starter generator and can mechanically start the internal combustion engine.

6. The torque transfer device according to claim 3, wherein the internal combustion engine is configured to transfer a torque via a K0 clutch to an output side or is configured to transfer a torque to the electric motor.

7. The torque transfer device according to claim 6, wherein a second electric motor is provided for torque transfer to the output side.

8. The torque transfer device according to claim 1, wherein the electric motor is connected to the torsional vibration damper via a transmission.

* * * * *